(No Model.)
A. PITMAN.
GLASS BLOWING TUBE.
No. 503,676. Patented Aug. 22, 1893.
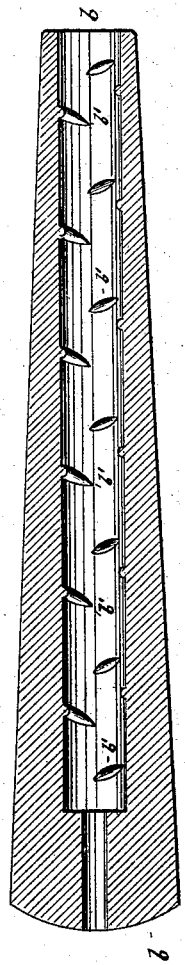
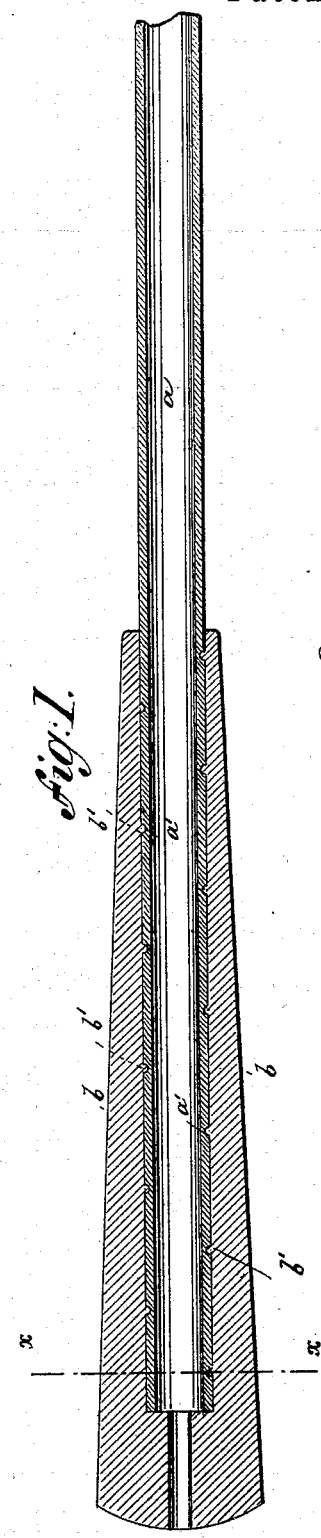
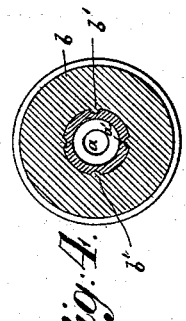
WITNESSES:
A. Schehl.
Wm. Schulz.
INVENTOR:
A. Pitman
BY Roeder & Briesen
ATTORNEYS

UNITED STATES PATENT OFFICE.

AARON PITMAN, OF MATAWAN, NEW JERSEY.

GLASS-BLOWING TUBE.

SPECIFICATION forming part of Letters Patent No. 503,676, dated August 22, 1893.

Application filed December 3, 1892. Serial No. 453,963. (No model.)

*To all whom it may concern:*

Be it known that I, AARON PITMAN, of Matawan, Monmouth county, New Jersey, have invented an Improved Glass-Blowing Tube, of which the following is a specification.

This invention relates to an improvement in glass blowing tubes and more particularly to means for securing the tube to the nozzle in such a manner that they will not become disconnected or loosened during use.

The invention consists in the various features of improvement more fully pointed out in the claims.

In the accompanying drawings: Figure 1 is a longitudinal central section of my improved glass blowing tube; Fig. 2 a similar section through the nozzle $b$; Fig. 3 a side view of the tube $a$, and Fig. 4 a cross section on line $x, x$, Fig. 1.

The letter $a$, represents the tube proper extending into a central bore of the nozzle $b$. The tube $a$, is provided at the end entering the nozzle, with a series of indentations or grooves $a'$, preferably arranged in rows and pointing in opposite directions. The nozzle $b$, is made from a suitable alloy and is provided within its bore with a set of ribs or projections $b'$, corresponding in size and position to the grooves $a'$. Each rib is received by one of the indentations or grooves and in this way, tube and nozzle are intimately connected and will not become loosened or separated during use, owing to an unequal expansion.

To manufacture my improved glass blower's tube, the tube $a$, provided with the grooves is inserted with its end into a mold and then the alloy is poured around it, to fill out the grooves and form the ribbed nozzle. Of course the grooves may be formed upon the nozzle $b$, and the ribs upon the tube $a$, if desired.

What I claim is—

1. A glass blowing tube composed of a grooved tube $a$, and of a nozzle having inwardly extending projections that enter the grooves, substantially as specified.

2. A glass blowing tube composed of a tube $a$, having a series of grooves that point in opposite directions and of a nozzle having corresponding projections that enter such grooves, substantially as specified.

AARON PITMAN.

Witnesses:
 F. V. BRIESEN,
 A. JONGHMANS.